(12) United States Patent
Abdellaziz Trimeche et al.

(10) Patent No.: US 7,825,963 B2
(45) Date of Patent: Nov. 2, 2010

(54) METHOD AND SYSTEM FOR CAPTURING AN IMAGE FROM VIDEO

(75) Inventors: Mejdi Ben Abdellaziz Trimeche, Tampere (FI); Antti Tapani Aaltonen, Tampere (FI)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 11/857,623

(22) Filed: Sep. 19, 2007

(65) Prior Publication Data
US 2009/0073266 A1 Mar. 19, 2009

(51) Int. Cl.
*H04N 9/68* (2006.01)
(52) U.S. Cl. .................. 348/235; 348/234; 348/252
(58) Field of Classification Search .......... 348/234, 348/235, 252; 358/906, 909.1; 455/556.1
See application file for complete search history.

(56) References Cited

U.S. PATENT DOCUMENTS 4,551,753 A * 11/1985 Nishizawa et al. .......... 348/446

2005/0257152 A1 11/2005 Shimizu et al.
2006/0140614 A1 6/2006 Kim et al.
2007/0132874 A1 * 6/2007 Forman et al. ......... 348/333.02

FOREIGN PATENT DOCUMENTS

EP 1400923 A 3/2004
WO 03/009216 A 1/2003

OTHER PUBLICATIONS

"International Search Report and Written Opinion," PCT/IB2008/002451, mailed May 25, 2009.

* cited by examiner

*Primary Examiner*—Yogesh K Aggarwal (57) ABSTRACT

A method including presenting a video sequence on a display where the video sequence includes video frames, calculating a quality indicator with respect to the video frames and automatically indicating which video frames meet or exceed a predetermined image quality threshold depending on the quality indicator.

21 Claims, 12 Drawing Sheets

METHOD AND SYSTEM FOR CAPTURING AN IMAGE FROM VIDEO

BACKGROUND

1. Field

The disclosed embodiments generally relate to video playback and, more particularly, to capturing images from video sequences.

2. Brief Description of Related Developments

Conventional methods for presenting and implementing video printing functionality in personal computers and mobile multimedia software are generally complicated and reserved for advanced users. Generally, the conventional methods include manipulating video editing software or frame grabbing utilities.

Additionally, there are video summarization programs that may require manipulating video editing software or frame grabbing utilities. In the video summaries, portions of a video are selected and presented as a video clip. The displayed frames of the video clip are generally selected from compressed video content resulting in generally poor image quality and an inadequate story line or representation of the full video from which the clip was taken.

It would be advantageous to automatically select the best image frames from a video sequence and allow a user to select the best images for printing or reproduction. It would also be advantageous to have a simplistic user interface for indicating to a user when a video frame(s) is suitable for capture such that the captured frame(s) are of high quality and representative of the story line of the video from which they are taken.

SUMMARY

In one aspect, the disclosed embodiments are directed to a method. In one embodiment the method includes presenting a video sequence on a display where the video sequence includes video frames, calculating a quality indicator with respect to the video frames and automatically indicating which video frames meet or exceed a predetermined image quality threshold depending on the quality indicator.

In another aspect, the disclosed embodiments are directed to an apparatus. In one embodiment the apparatus includes a processor, an input device connected to the processor and a display connected to the processor, wherein the processor is configured to present a video sequence on the display where the video sequence includes video frames, calculate a quality indicator with respect to the video frames and automatically indicate which video frames meet or exceed a predetermined image quality threshold depending on the quality indicator.

In another aspect, the disclosed embodiments are directed to a system. In one embodiment the system includes means for presenting a video sequence on a display where the video sequence includes video frames, means for calculating a quality indicator with respect to the video frames, means for indicating which video frames meet or exceed a predetermined image quality threshold depending on the quality indicator and means for changing the threshold value for image quality.

In another aspect, the disclosed embodiments are directed to a user interface. In one embodiment the user interface includes a frame selection control module connected to a display, the frame selection control module being configured to determine which frames in a sequence of video frames presented on a display exceed a predetermined image quality threshold value and a frame indication module connected to at least one of the frame selection control module and display, the frame indication module being configured to allow viewing and selection of one or more of the frames that exceed the predetermined image quality value for printing.

In another aspect, the disclosed embodiments are directed to a method for printing video frames. In one embodiment the method includes automatically determining which frames in a sequence of video frames presented on a display exceed a predetermined image quality threshold value, presenting the frames, along with a corresponding quality indicator, that exceed the predetermined image quality threshold value for selection and selecting one or more of the frames that exceed the predetermined image quality threshold value for printing.

In yet another aspect, the disclosed embodiments are directed to a computer program product embodied in a memory of a device. In one embodiment the computer program product includes a computer useable medium having computer readable code means embodied therein for causing a computer to capture one or more video frames from a sequence of video frames. The computer readable code means in the computer program product includes computer readable program code means for causing a computer to present a sequence of video frames on a display, computer readable program code means for causing a computer to calculate a quality indicator with respect to the sequence of video frames, computer readable program code means for causing a computer to indicate which video frames meet or exceed a predetermined image quality threshold depending on the quality indicator and computer readable program code means for causing a computer to capture one or more video frames that meet or exceed the predetermined image quality threshold.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(s)

Figure 1:
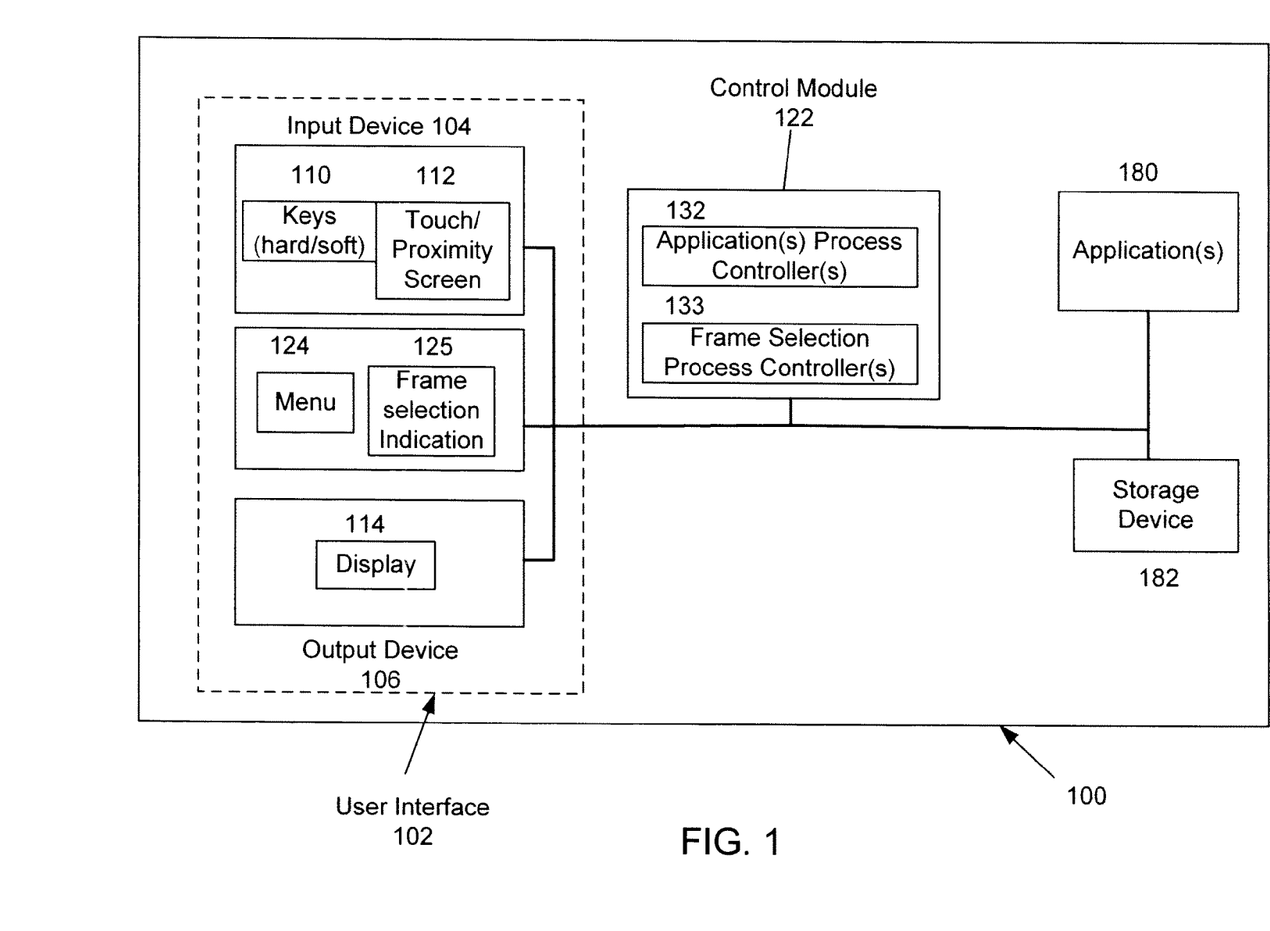
FIG. 1 shows a block diagram of a system in which aspects of the disclosed embodiments may be applied.

FIG. 1 illustrates one embodiment of a system 100 in which aspects of the disclosed embodiments can be used. Although aspects of the disclosed embodiments will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user of a device or system, such as the system 100 shown in FIG. 1 to select one or more frames of a video sequence. The video sequence may be captured by the system or acquired by the system in any suitable manner. The disclosed embodiments select the highest quality frames (e.g. the sharpest and clearest frames) from a video sequence. In the disclosed embodiments a sharpness value is calculated for each frame of the video and a relative sharpness measure compares the sharpness between adjacent video frames. The user interface of the disclosed embodiments indicates which frames are suitable for capture such that the captured frames are of a maximized image quality. In the disclosed embodiments, the user may play, step through or search the video frames in any suitable manner. Any suitable quality indicator may indicate a quality of the respective frames as the frames are presented on a display of the system 100. The user may select one or more of the video frames for printing, attachment to an electronic message (e.g. email, multimedia messages, etc.) transfer to a storage device or for any suitable type of reproduction such as, for example, displaying the selected frame(s) on a display of a device. It should be realized that while the disclosed embodiments described selecting video frames that meet or exceed a predetermined quality level a user may also select video frames that do not meet or exceed the quality level in a manner substantially similar to that described below.

In one embodiment, the system 100 of FIG. 1 can include an input device 104, output device 106, a control module 122, applications area 180 and storage/memory device 182. In one embodiment, the system 100 can include a video frame selection controller 133 that is configured to select the best frame(s) from a video sequence. The system 100 can also include a video frame indication module that is configured to allow a user to view and select relevant frames for printing or reproduction. The components described herein are merely exemplary and are not intended to encompass all components that can be included in the system 100. In alternate embodiments, the system 100 can include any suitable components for automatically selecting the best frame or frames from a video sequence as well as presenting a video story line that allows the user to select relevant frames for printing. For example, in one embodiment, the system 100 comprises a mobile communication device or other such internet and application enabled devices including, but not limited to, personal computers, laptop computers, tablet computers, mobile phones, smart phones, personal digital assistants, and portable gaming devices. In one embodiment the applications of the device may include, but are not limited to, data acquisition (e.g. image, video and sound recorders) and multimedia players (e.g. video and music players). Thus, in alternate embodiments, the system 100 can include other suitable devices and applications for monitoring application content and acquiring data and providing communication capabilities in such a device. While the input device 104 and output device 106 are shown as separate devices, in one embodiment, the input device 104 and output device 106 can be part of, and form, the user interface 102. The user interface 102 can be used to display application information such as images, videos and other multimedia information and allow the user to select portions of the multimedia information for capture as will be described below. In one embodiment, the user interface of the disclosed embodiments can be implemented on or in a device that includes a touch screen display. In alternate embodiments, the aspects of the user interface disclosed herein can be embodied on any suitable device that will display information and allow the selection and activation of applications and other information.

In one embodiment, the user interface 102 of the disclosed embodiments can be implemented on or in a device that includes a touch screen display, a proximity screen device 112 and/or a speech input device. In alternate embodiments, the aspects of the user interface disclosed herein can be embodied on any suitable device that will display information and allow the selection, activation and operation of applications. The terms "select", "contact", "touch", "slide" and "move" are generally described herein with respect to a touch screen display. However, in alternate embodiments, the terms are intended to encompass the required user action with respect to other input devices. For example, with respect to a proximity screen device, it is not necessary for the user to make direct contact in order to select, contact, touch, slide or move an object or other information. Thus, the above noted terms are intended to encompass that a user only needs to be within a proximity of the device to carry out the desired function. For example, the term "contact" when used in the context of a proximity screen device, does not imply direct contact, but rather near or close contact, that activates the proximity device.

Similarly, the scope of the intended devices is not limited to single touch or contact devices. Multi-touch devices, where contact by one or more finger or other pointing devices can navigate on and about the screen are also intended to be encompassed by the disclosed embodiments.

Figure 7:
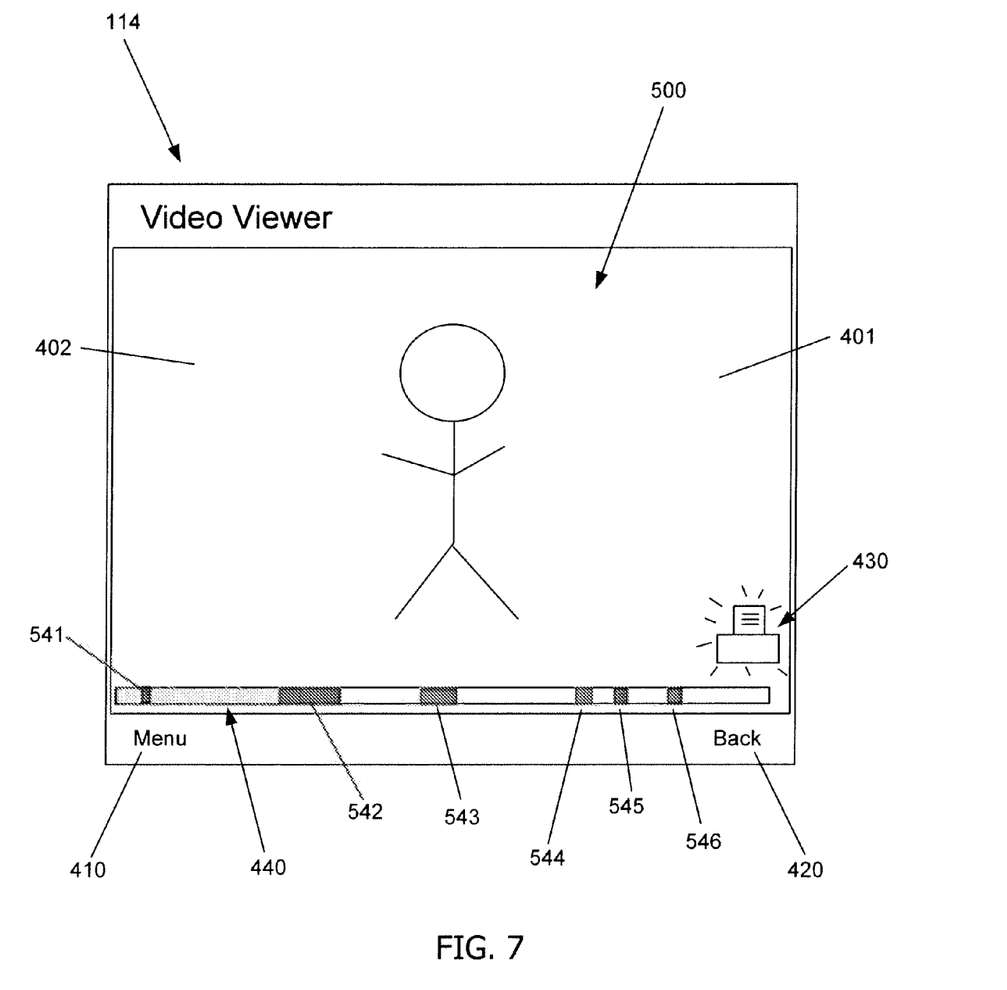
Figure 8:
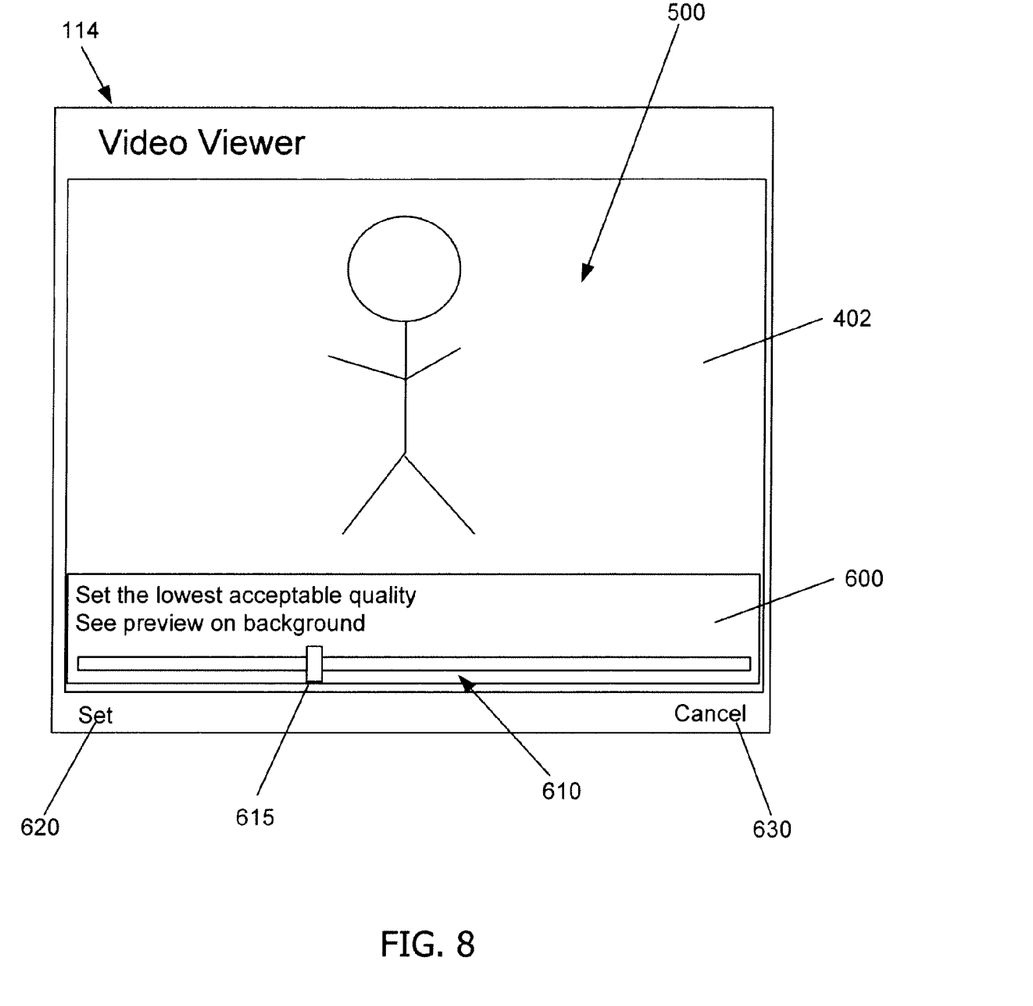

In one embodiment, the video frame selection controller 133 will automatically select video frames from a sequence of video frames that meet or exceed a predetermined quality threshold. Referring also to FIGS. 7 and 8, in one aspect of the disclosed embodiments the frame selection controller 133 includes signal processing that measures the temporal variation of the sharpness in adjacent video frames to determined if a respective video frame meets the predefined quality threshold. The video frame selection controller 133, for example, causes the video frame indication module 125 to present an indication of which frames meet or exceed the predetermined quality threshold. The video frame indication module 125 includes, for example, a fast scene cut detection algorithm causes an indication to be presented through the user interface with respect to portions of the video image or sequence that meets or exceeds the predetermined quality threshold. The user interface 102 of the system 100 is configured to allow a user to view the indicated frames and select relevant frames representative of a video story line as will be described herein.

Figure 2:
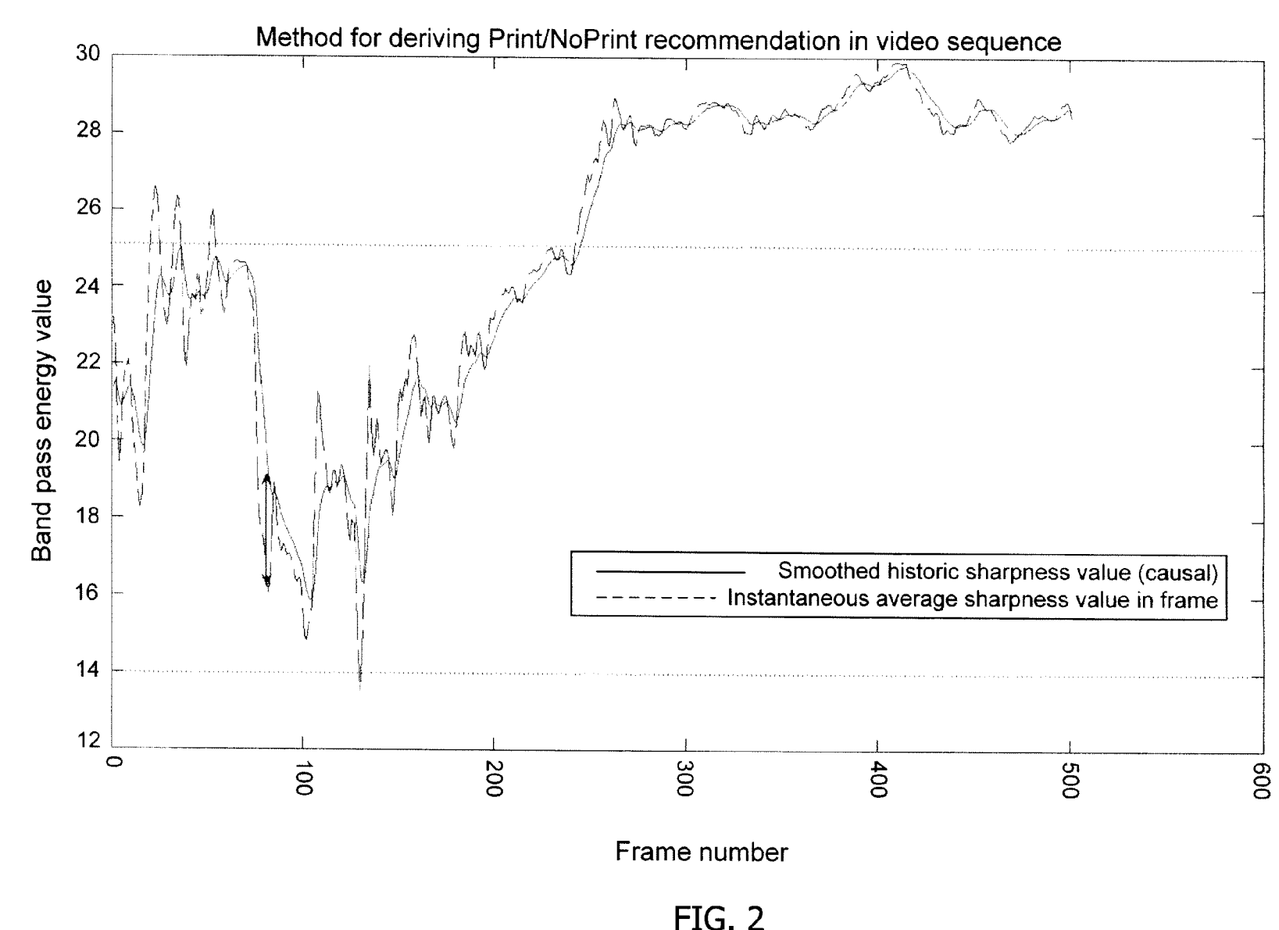
FIG. 2 is a graph illustrating one example of a process according to the disclosed embodiments.
Figure 3:
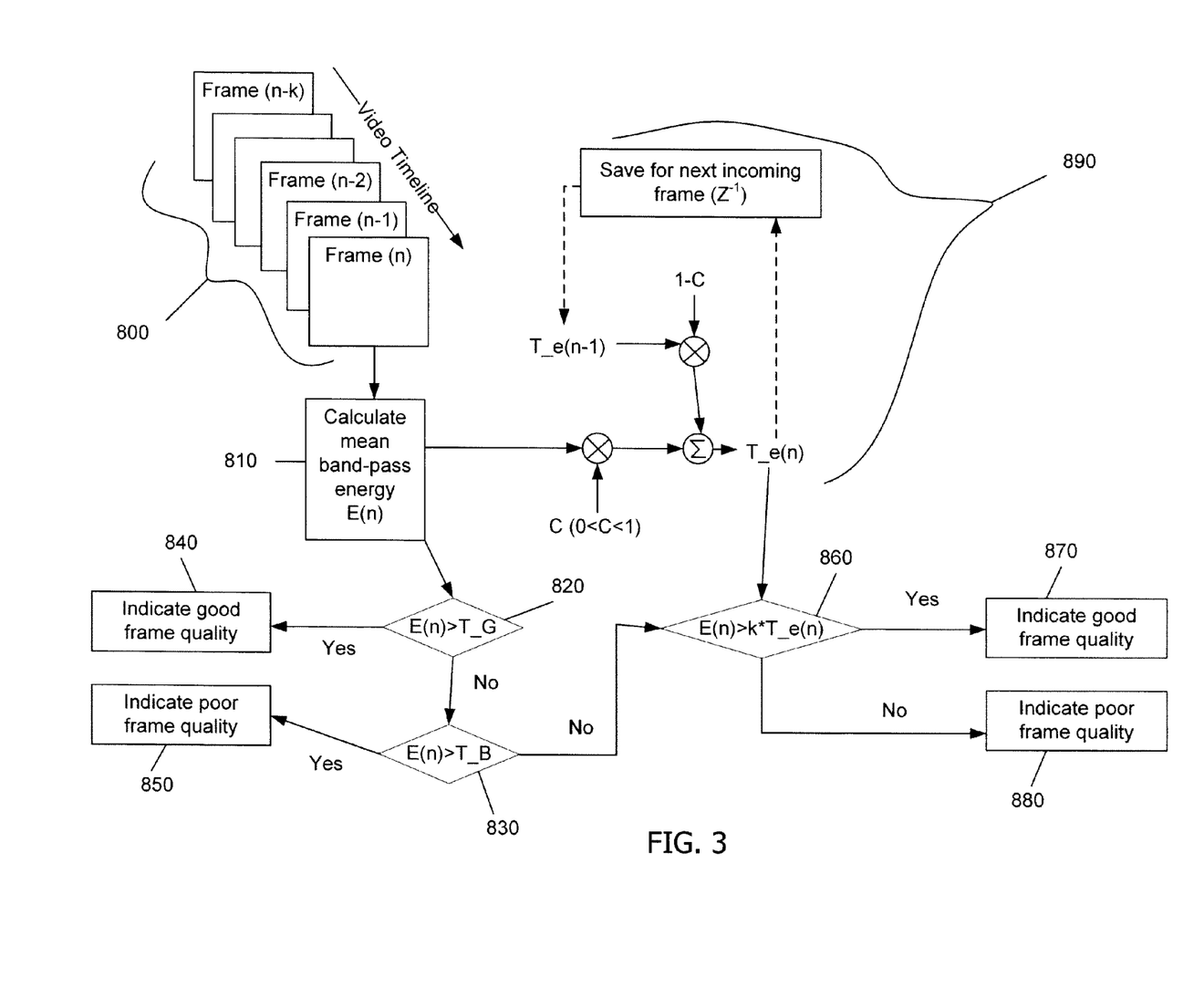
FIG. 3 is a flow chart illustrating one example of a process according to the disclosed embodiments.

In one embodiment, the image quality of the respective frames is based on, for example, the percentage of sharp areas, which may be derived from histogram distributions. In one example, the frame selection controller 133 is configured to read the image data from a video sequence or image being played or recorded in/on the system 100 (FIG. 3, Block 800). In alternate embodiments, the frame selection controller 133 may be configured to analyze video being recorded or played on any suitable device connected to the system 100. Any suitable filters including, but not limited to, band pass filters may be used to determine, for example, the sharpness of the video image frames. For example, the average or mean band pass energy of each frame may be calculated in any suitable manner (FIG. 3, Block 810). The mean band pass energy calculation returns an absolute sharpness measurement and a percentage of the image area that is larger than a preset area threshold (e.g. a sharpness or any other suitable image quality threshold). This preset area threshold may be set at any suitable time and in any suitable manner including, but not limited to, during the manufacture of the system 100 or an application in which the disclosed embodiments are employed. A relative sharpness is also measured. The relative sharpness compares the sharpness across adjacent video frames. The relative sharpness may be calculated by comparing the sharpness of one frame against an averaged or smoothed sharpness value(s) from adjacent previous image frames. The smoothed or averaged sharpness value may additionally provide for an historic or temporal value of the sharpness of the analyzed video frames as can be seen in FIG. 2 (FIG. 3, Block 890). For example, the smoothed or averaged sharpness value may be calculated by means of a causal linear filter which adjusts varying weights to the sharpness values calculated for the preceding video frames. The weights of the filter can be adjusted to tune acceptable results or can be tuned in advance such as to give more importance to the most recent video frames. In one embodiment, the weights of the linear filter add up to one. In alternate embodiments, the weights of the linear filter may add upt to more or less than one.

The mean band pass energy E(n) is compared with an upper sharpness threshold TG (which may be set in any suitable manner at any suitable time) (FIG. 3, Block 820). If the mean band pass energy E(n) is greater than the upper threshold TG then the video frame indication module 125 presents an indication that the frame quality is acceptable (FIG. 3, Block 840). If the mean band pass energy E(n) is not greater than threshold TG the mean band pass energy E(n) is compared with a lower sharpness threshold TB (FIG. 3, Block 830). The lower threshold TB may be any suitable threshold such as an acceptable quality level as will be described below with respect to FIG. 8. If the mean band pass energy E(n) is less than the threshold TB the video frame indication module 125 may present an indication that the frame quality is not acceptable (FIG. 3, Block 850).

In one aspect, where, for example, the mean band pass energy E(n) is between the upper threshold TG and lower threshold TB, the sharpness percentage of the image area (calculated above) is compared with a preset sharpness area threshold. The sharpness area threshold may be any suitable threshold that is defined at any suitable time and in any suitable manner. If the sharpness percentage of the image area is greater than the sharpness area threshold the video frame indication module 125 presents an indication that the frame quality is acceptable.

In another aspect, where, for example, the mean band pass energy E(n) of the current frame is between the upper threshold TG and lower threshold TB, the mean band pass energy E(n) is compared with an historical or temporal sharpness value (FIG. 3, Block 860). An exemplary graph comparing the temporal sharpness value with the band pass energy E(n) of the current frame (i.e. instantaneous average sharpness value in the frame) is shown in FIG. 2. It is noted that in this example the band pass energy E(n) is compared with a smoothed historic sharpness value but in alternate embodiments any suitable historic sharpness value may be used. If the band pass energy E(n) is greater than the historic sharpness value the video frame indication module 125 presents an indication that the frame quality is acceptable (FIG. 3, Block 870). If the mean band pass energy E(n) is less than the historic sharpness the value video frame indication module 125 may present an indication that the frame quality is not acceptable (FIG. 3, Block 880). In one example, if the mean band pass energy E(n) of the current frame deviates more than a standard deviation below the historic sharpness value an indication that the frame quality is not acceptable may be presented.

Figure 4A:
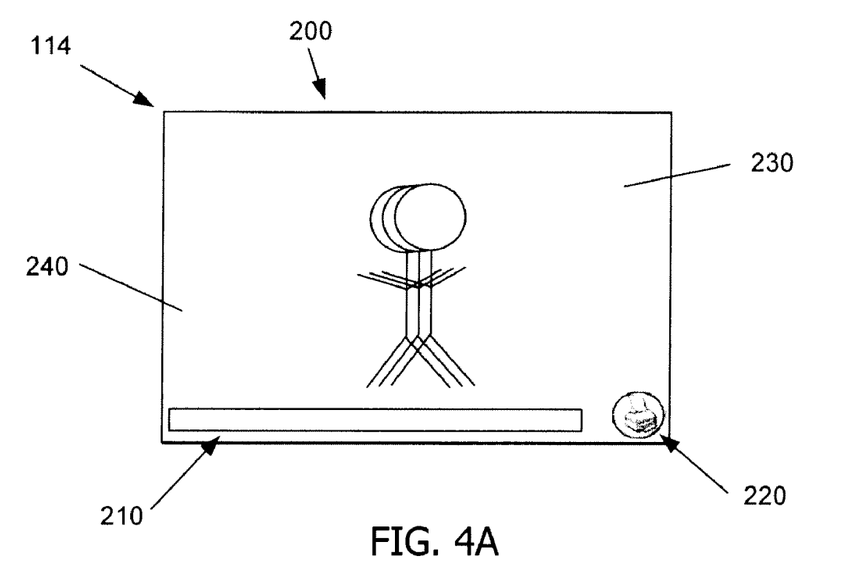
FIGS. 4A and 4B illustrate exemplary screen shots of the user interface in accordance with the disclosed embodiments.
Figure 4B:
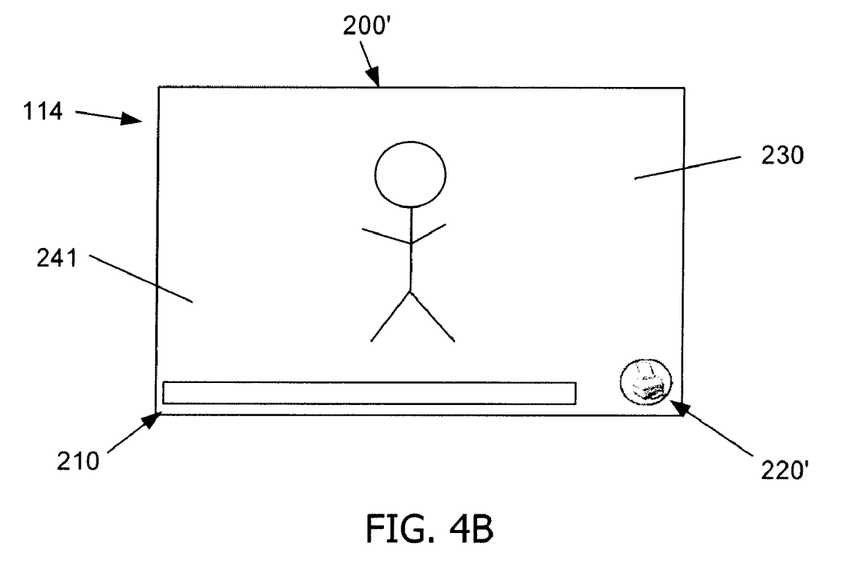

FIGS. 4A and 4B illustrate screen shots of one embodiment of a user interface 200 incorporating features of the disclosed embodiments. The user interface 200 is substantially similar to the user interface 102. The user interface 200 may be presented on, for example, a display 114 of the system. In this embodiment, the user interface may pertain to a video imaging application that may be configured to record images through, for example, a camera of the system 100 or play images acquired by or otherwise present in, for example, a memory 182 of the system. As can be seen in FIG. 4A the user interface 200 may include a video display area 230, a video information area 210 and a frame quality indicator 220. The video display area 230 may be configured to present any suitable video images to a user of the system 100. The video information area 210 may include any suitable information related to the video images including, but not limited to, file names, video descriptions/titles and a time the video was taken. The quality indicator 220 may indicate the image quality of the video frames. The quality indicator 220 in the disclosed embodiments is described as a visual indicator but in alternate embodiments the indicator may be a textual indicator, an aural indicator and/or tactile feedback indicator. For example, when a frame is presented that meets or exceeds the image quality threshold an audible sound and/or vibration of a device may indicate the image quality of the frame. Although the disclosed embodiments are described with reference to moving video images or sequences it should be understood that the terms "image" and "video" are not limited to, for example, interlaced or interleaved moving images but can also include still images (e.g. slide shows, animations, etc.) or any combination of still and moving images.

FIGS. 4A and 4B, show exemplary video frames 240, 241 respectively that may be successive frames of a video image. In this example, the video frame 240 is blurred compared to the exemplary video frame 241 shown in FIG. 4B. In accordance with one exemplary embodiment, the quality indicator 220, 220' may be presented to a user in any suitable manner. In one example, the quality indicator may be presented on the display 114 as the video plays or is recorded. As can be seen in FIG. 4A, where the image quality of a frame is bad (e.g. blurred, dark, washed out, etc.) or otherwise does not meet a predetermined quality threshold or level, the quality indicator 220 may be presented in, for example, a first color, where the first color indicates poor image quality. Alternatively, the indicator may be invisible or look as if being disabled, if the image quality is below set threshold value. Where the image quality of a frame meets or exceeds the predetermined quality threshold the quality indicator 220' may be presented in a second color, where the second color indicates the image quality meets or exceeds the threshold value. It should be understood that the first and second colors are used for exemplary purposes only and that any suitable colors or number of colors may be used to indicate different levels of image quality. In alternate embodiments, the quality of the frames may be indicated by varying transparency of image, moving images or text. In other alternate embodiments the frame quality may be indicated in any suitable manner. Further, while the quality indicators 220, 220' are shown in the Figures as an encircled printer, any suitable image (e.g. moving or still), icon, avatar or text may be utilized. Also the location, size and shape of the indicator may vary.

Figure 5A:
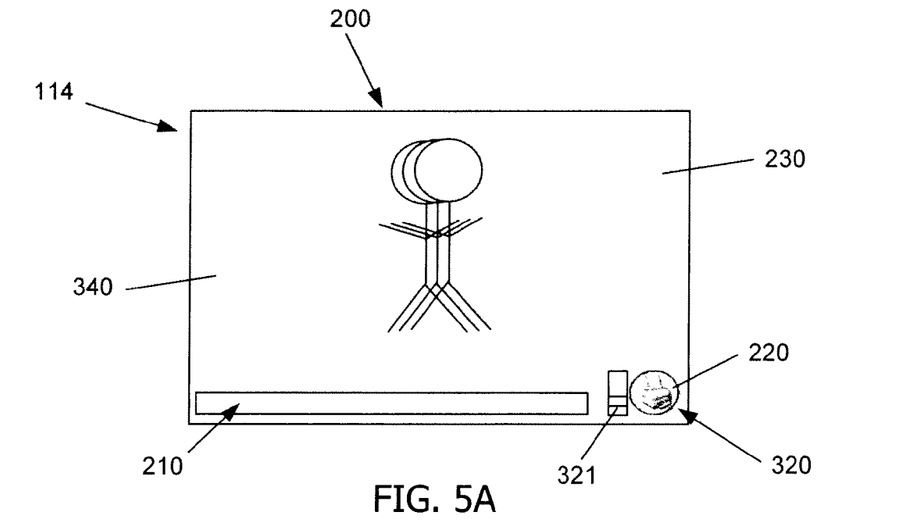
FIGS. 5A and 5B illustrate exemplary screen shots of the user interface in accordance with the disclosed embodiments.
Figure 5B:
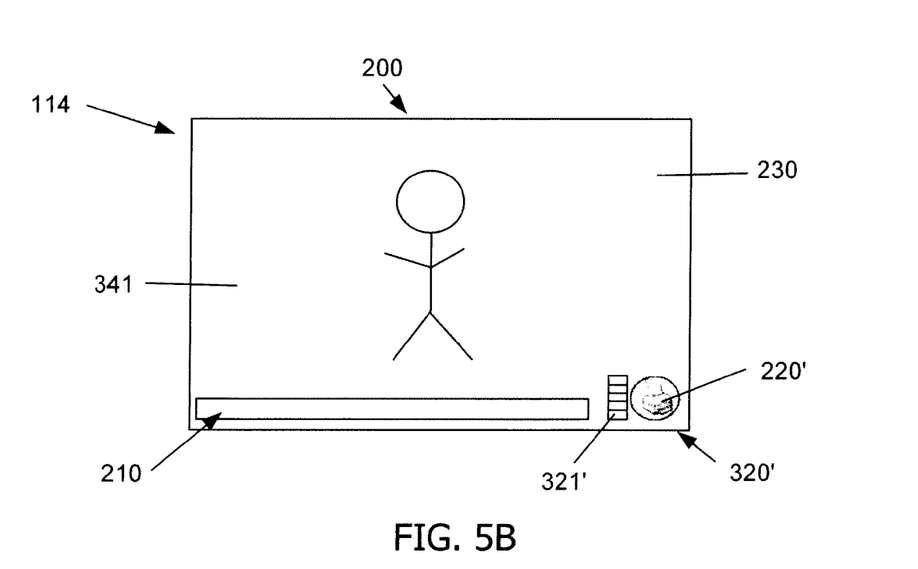

Referring now to FIGS. 5A and 5B, exemplary video frames 340, 341 are shown. As described above with respect to FIGS. 4A and 4B, the video frames 340, 341 may be successive video frames. In alternate embodiments the video frames 340, 341 may be any suitable video frames having any suitable relationship with each other. In this example, video frame 340 does not meet the predetermined quality threshold while video frame 341 meets the predetermined quality threshold. As can be seen in FIGS. 5A and 5B the quality indicators 320, 320' include the encircled printer 220, 220' as described above with respect to FIGS. 4A and 4B as well as an image quality meter 321, 321'. The image quality meter 321, 321' may be any suitable meter. In this example, the image quality meter 321, 321' may be substantially similar to a "battery meter" where, for example, a full meter indicates a maximized video quality and an empty meter indicates a minimized video quality. The meter may be divided into different colors where a first color indicates the image quality of a respective frame is below the threshold level while a second color indicate the image quality is above the threshold level in a manner substantially similar to that described above with respect to FIGS. 4A and 4B. The meter may be divided in one or more discrete blocks and/or its location, shape and size may vary. In alternate embodiments the meter may have any suitable configuration.

Figure 6:
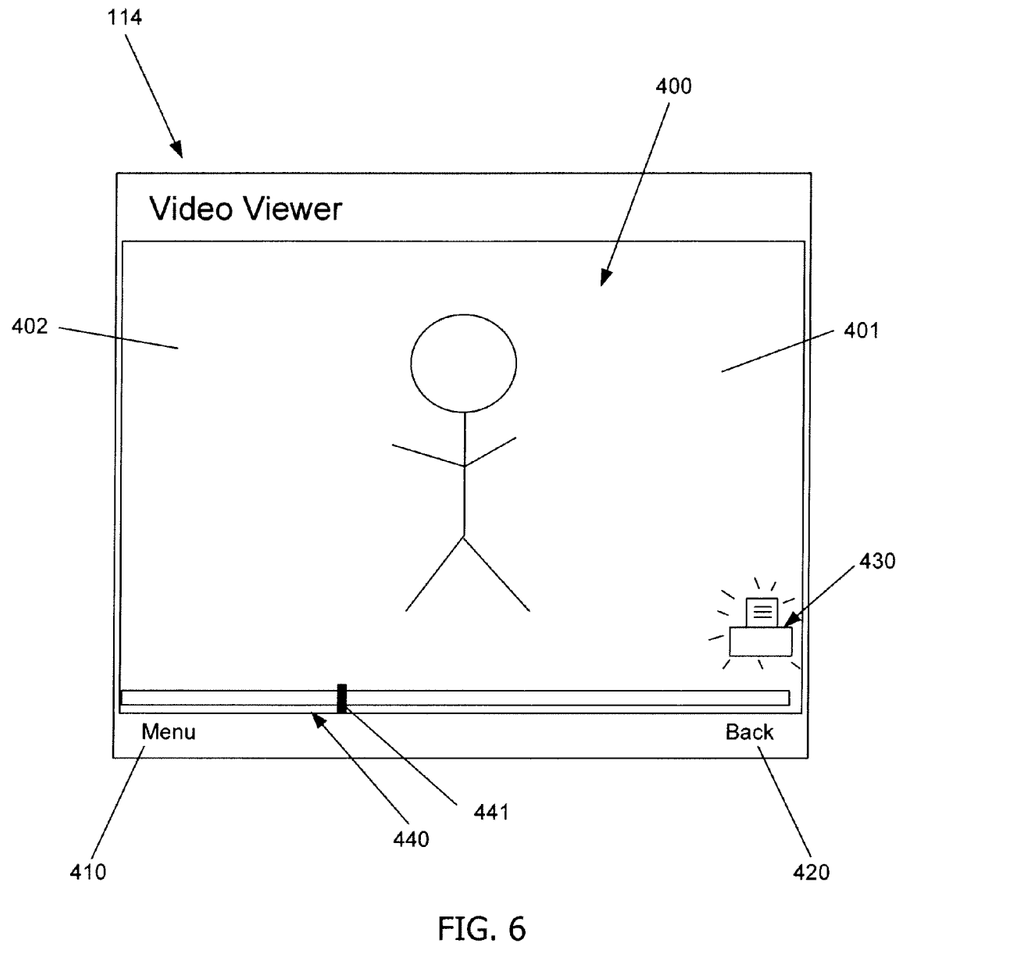
FIGS. 6 through 8 illustrate exemplary screen shots of the user interface in accordance with the disclosed embodiments.

In other embodiments, when the frame image quality is above the predetermined threshold the quality indicator 430 may appear illuminated (e.g. an outer glow effect or other suitable effect) as can be seen in, FIGS. 6 and 7. The color of the glow or illumination may vary according to the quality of the frame. In still other embodiments, the image quality indicator may appear when the frame quality is above the threshold value and disappear when the frame quality is below the threshold value. In alternate embodiments, the image quality indicator may appear, disappear and/or change appearance in any suitable manner to indicate the quality level of a respective video frame is above a predetermined value. It should be understood that any suitable numbers of quality indicators (e.g. indicators 320, 321) may be used in combination or separately in any suitable manner including, but not limited to, the examples described above.

Referring now to FIG. 6, another user interface 400 is shown on, for example, the display 114 of the system. The user interface 400 may be substantially similar to user interface 102. In this example, the user interface pertains to a video viewer and includes a video display area 401, a video progress bar 440, an image quality indicator 430 and keys 410, 420. The video display area 401 and image quality indicator 430 may be substantially similar to those described above. The keys 410, 420 may be, for example, soft keys that are activated in any suitable manner such as by touching a touch screen display of the system 100 or by any suitable key 110 of the input device 104. The keys 410, 420 may be any suitable keys, for example, key 410 may be a menu key that when activated presents any suitable settings for the video viewer and/or image quality indicator.

In this example, the video progress bar is shown on the display 114. It is noted that a video progress bar may also be displayed in the user interfaces of FIGS. 4A-5B. In this example, as the video is played the image quality indicator 430 may indicate to the user that respective frames, such as frame 402, of the video are above the predetermined image quality threshold. In this example, the video may be paused or otherwise stopped when the quality indicator 430 indicates a frame at an acceptable quality level. The video may be stepped through in any suitable direction (i.e. such that the video plays in a forward or reverse direction) such that as each frame is displayed the quality indicator 430 indicates the respective frame quality. The video may be stepped through in any suitable manner including, but not limited to, any suitable keys 110 of the input device 104, a touch screen display or a proximity screen 112, by moving a slider 441 of the video progress bar and slow motion features of the video player. When a desired frame is presented on the display, that frame may be selected for capture as will be described below. In another embodiment, system may be configured so that only the frames or parts of the video that meet or exceed the acceptable quality level are displayed for viewing or step through by a user. By only showing the acceptable video frames an efficiency of selecting frames may be increased.

It is noted that activating the keys 110 or any other controls such as a touch screen or proximity screen 112 generally includes any suitable manner of selecting or activating a function associated with the device, including touching, pressing or moving the input device. In one embodiment, where the input device 104 comprises control 110, which in one embodiment can comprise a device having a keypad, pressing a key can activate a function as described above. Alternatively, where the control 110 of input device 104 also includes a multifunction rocker style switch, the switch can be used to select a menu item and/or select or activate a function. When the input device 104 includes control 112, which in one embodiment can comprise a touch screen pad, user contact with the touch screen will provide the necessary input. Voice commands and other touch sensitive input devices can also be used.

Referring now to FIG. 7, another exemplary user interface 500 is shown. The user interface 500 may be substantially similar to user interface 400 described above. However, in this embodiment, the system 100 may be configured to analyze the video in any suitable manner and determine which frames or portions of the video meet or exceed the predetermined quality threshold. In this example, the frames or portions of the video that meet or exceed the quality threshold are presented on the video progress bar 440 in any suitable manner including, but not limited to, the darkened areas 541-546. In alternate embodiments the areas 541-546 may be presented in a scalable manner where for example, certain features of the areas 541-546 indicate a level of frame quality. For example, the areas may include patterns, colors or any other suitable indicators to indicate how much above or below the predetermined quality threshold a respective frame quality is. It is noted that the quality indicators 220, 220', 320, 320', 430 may also be presented in a scalable manner. The video may be played or stepped through in any suitable manner, such as that described above, so that any suitable frames within the areas 541-546 are presented on the display 114.

Referring now to FIG. 8, an exemplary screen shot of the user interface 500 is shown. The user interface 500 may be substantially similar to user interface 102. In this example, an image quality input area or menu 600 is shown on the display 114. The image quality input area 600 may be accessed in any suitable manner such as through any suitable settings menu, including menu 410, of the system 100. The image quality input area 600 may be presented in any suitable manner and in any suitable location of the display 114 such as for example, as a pop-up display area. It is noted that placement of the image quality input area 600 on the bottom of the display 114 as shown in FIG. 8 is for exemplary purposes only. Although the disclosed embodiments are described herein with respect to sharpness, the image quality settings may include settings for any suitable properties of the video image including, but not limited to, sharpness, brightness, contrast, gamma and saturation. The predetermined image quality may be set in any suitable manner. In this example, the lowest acceptable image quality may be set with a bar/slider arrangement. In other examples the maximum image quality may also be set in a substantially similar manner. In this example, as the slider 615 is moved along the quality settings bar 610 the frame changes to reflect the quality settings (i.e. a preview) thereby giving the user feedback as to what the quality level looks like when applied to an image. The quality level may also be set as a numerical value or any other suitable value that can be entered through the input device 104. In alternate embodiments, the predetermined quality level may be set during manufacture of the system 100 or applications in which the disclosed embodiments are implemented.

When the quality indicator, such as indicators 220, 220', 320, 320', 430 indicate acceptable frame quality levels, the user may capture the respective frame(s) in any suitable manner, such as through, for example, any suitable keys 110, 410 or by substantially touching a touch or proximity screen. The frame captures can be, for example, printed (e.g. hard copy printing such as a photograph or on paper), saved to a file, sent as a message or otherwise shared with other people. The file may be a thumbnail to identify the video sequence or used for any other suitable purpose including, but not limited to, backgrounds, icons, wallpapers or saved as pictures. The messages may be any suitable messages including, but not limited to, email, instant messages and multimedia messages where the frame captures are, for example, embedded and/or attached to the message. In other embodiments, the frame captures may be shared or viewed in any suitable manner such as, for example, through a display of any suitable device connected to or part of the system 100. In still other embodiments the frame captures may be sent to a device for sharing the frame captures in any suitable manner including, but not limited to, short range communications (e.g. Bluetooth, infrared, Zigbee, local area network, etc.) and/or long range communication (e.g. cellular, wide area network, etc.). In other embodiments, the image frames that meet or exceed the quality level can be combined into a file such that the file includes only frames having a predetermined quality level.

Figure 9A:
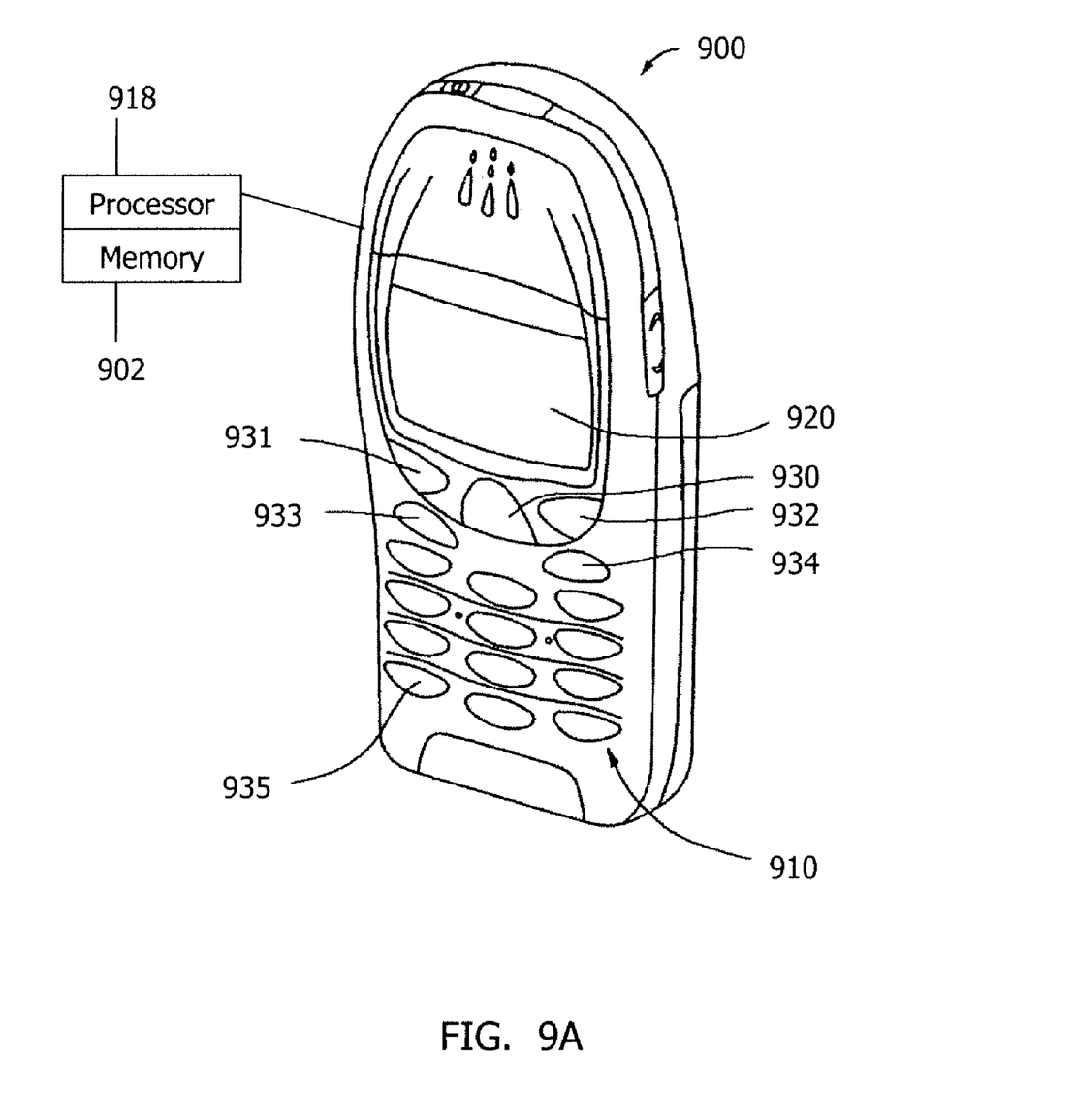
FIGS. 9A and 9B are illustrations of examples of devices that can be used to practice aspects of the disclosed embodiments.
Figure 9B:
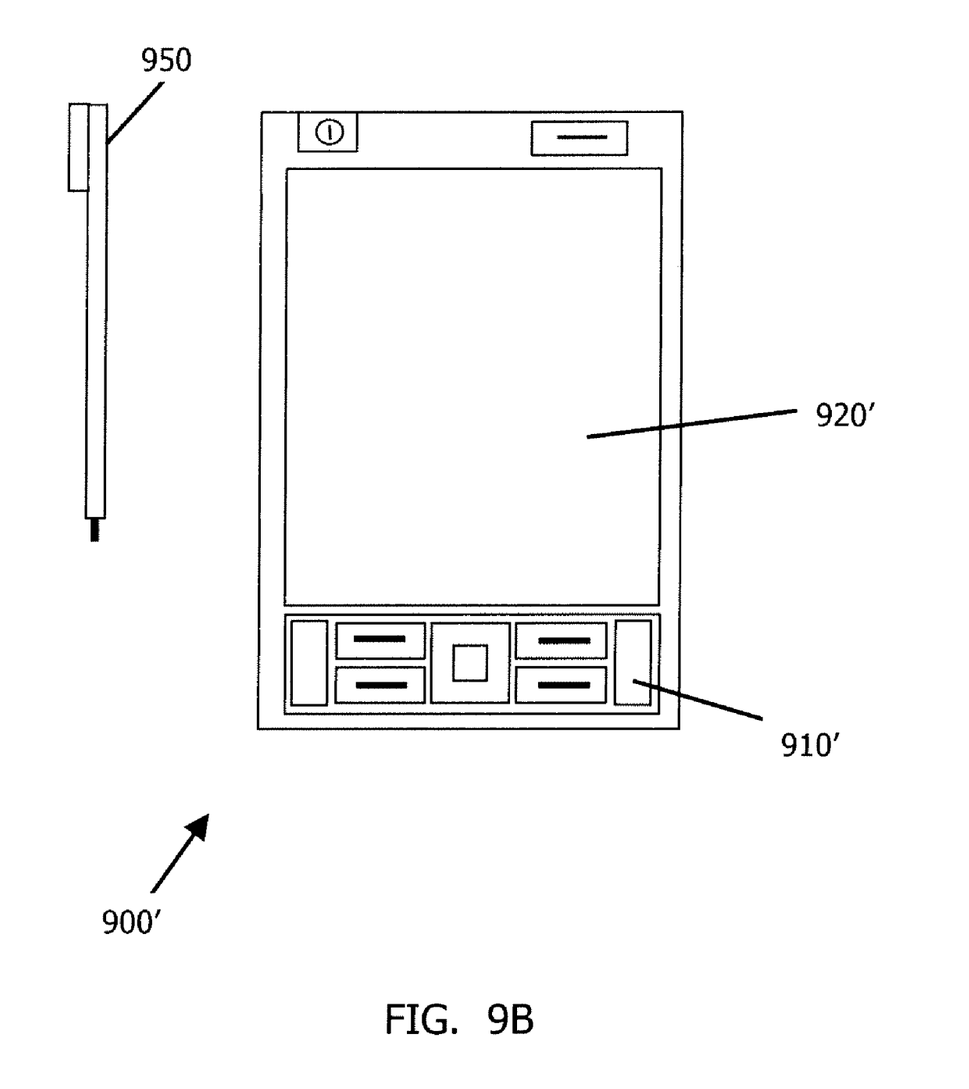

Examples of devices on which aspects of the disclosed embodiments can be practiced are illustrated with respect to FIGS. 9A and 9B. The terminal or mobile communications device 900 may have a keypad 910 and a display 920. The keypad 910 may include any suitable user input devices such as, for example, a multi-function/scroll key 930, soft keys 931, 932, a call key 933, an end call key 934 and alphanumeric keys 935. The display 920 may be any suitable display, such as for example, a touch screen display or graphical user interface. The display may be integral to the device 900 or the display may be a peripheral display connected to the device 900. A pointing device, such as for example, a stylus, pen or simply the user's finger may be used with the display 920. In alternate embodiments any suitable pointing device may be used. In other alternate embodiments, the display may be a conventional display. The device 900 may also include other suitable features such as, for example, a camera, loud speaker, connectivity port or tactile feedback features. The mobile communications device may have a processor 918 connected to the display for processing user inputs and displaying information on the display 920. A memory 902 may be connected to the processor 918 for storing any suitable information and/or applications associated with the mobile communications device 900 such as phone book entries, calendar entries, etc.

Figure 10:
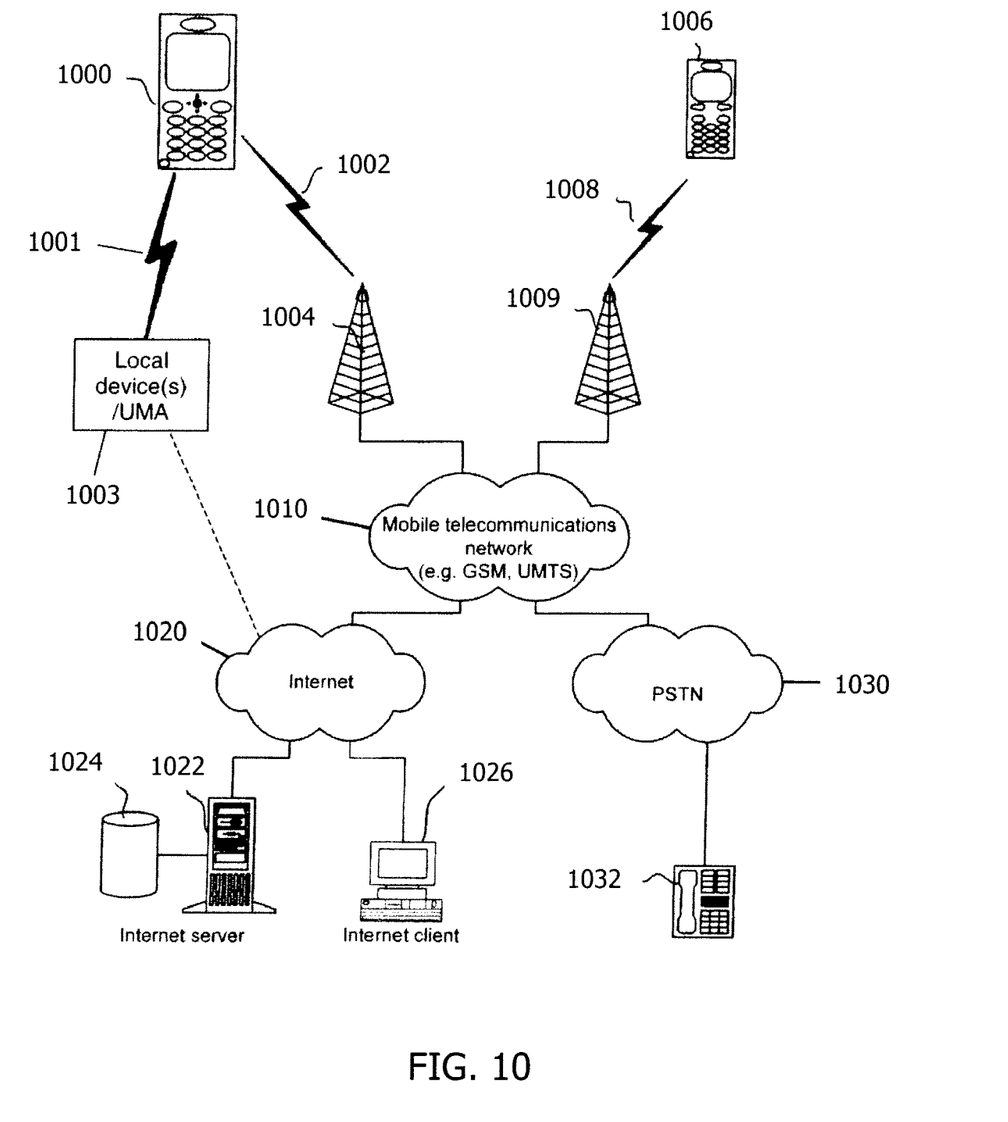
FIG. 10 is a block diagram illustrating the general architecture of an exemplary system in which the exemplary devices of FIGS. 9A and 9B may be used.

In the embodiment where the device 900 comprises a mobile communications device, the device can be adapted to communication in a telecommunication system, such as that shown in FIG. 10. In such a system, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 1000 and other devices, such as another mobile terminal 1006, a line telephone 1032, a personal computer 1051 or an internet server 1022. It is to be noted that for different embodiments of the mobile terminal 1000 and in different situations, some of the telecommunications services indicated above may or may not be available. The aspects of the disclosed embodiments are not limited to any particular set of services in this respect.

The mobile terminals 1000, 1006 may be connected to a mobile telecommunications network 1010 through radio frequency (RF) links 1002, 1008 via base stations 1004, 1009. The mobile telecommunications network 1010 may be in compliance with any commercially available mobile telecommunications standard such as for example GSM, UMTS, D-AMPS, CDMA2000, (W)CDMA, WLAN, FOMA and TD-SCDMA.

The mobile telecommunications network 1010 may be operatively connected to a wide area network 1020, which may be the internet or a part thereof. An internet server 1022 has data storage 1024 and is connected to the wide area network 1020, as is an internet client computer 1026. The server 1022 may host a www/wap server capable of serving www/wap content to the mobile terminal 1000.

A public switched telephone network (PSTN) 1030 may be connected to the mobile telecommunications network 1010 in a familiar manner. Various telephone terminals, including the stationary telephone 1032, may be connected to the PSTN 1030.

The mobile terminal 1000 is also capable of communicating locally via a local link 1001 or 1051 to one or more local devices 1003 or 1050. The local links 1001 or 1051 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 1003 can, for example, be various sensors that can communicate measurement values to the mobile terminal 1000 over the local link 1001. The above examples are not intended to be limiting, and any suitable type of link may be utilized. The local devices 1003 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 1000 may thus have multi-radio capability for connecting wirelessly using mobile communications network 1010, WLAN or both. Communication with the mobile telecommunications network 1010 may also be implemented using WiFi, WiMax, or any other suitable protocols, and such communication may utilize unlicensed portions of the radio spectrum (e.g. unlicensed mobile access (UMA)). In one embodiment, the control module 122 of FIG. 1 can include a communications module that is configured to interact with the system described with respect to FIG. 10.

In one embodiment, the system 100 of FIG. 1 may be for example, a PDA style device 900' illustrated in FIG. 9B. The PDA 900' may have a keypad 910', a touch screen display 920' and a pointing device 950 for use on the touch screen display 920'. In still other alternate embodiments, the device may be a personal communicator, a tablet computer, a laptop or desktop computer, a television or television set top box, or any other suitable device capable of containing a display such as display 920' and supported electronics such as a processor and memory. Although the exemplary embodiments are described with reference to the mobile communications devices 900, 900' for exemplary purposes only and it should be understood that the embodiments could be applied equally to any suitable device incorporating a display, processor, memory and supporting software or hardware.

The user interface 102 of FIG. 1 can also include a menu system 124. The control module 122 provides for the control of certain processes of the system 100. The menu system 124 can provide for the selection of different tools and application options related to the applications or programs running on the system 100. In the embodiments disclosed herein, the control module 122 receives certain inputs, such as for example, signals, transmissions, instructions or commands related to the functions of the system 100, such as the frame identification and capture functions described herein. Depending on the inputs, the control module interprets the commands and directs the process control 132 to execute the commands accordingly.

Although the above embodiments are described as being implemented on and with a mobile communication device, it will be understood that the disclosed embodiments can be practiced on any suitable device. For example, the system 100 of FIG. 1 can generally comprise any suitable electronic device, such as for example a personal computer, a personal digital assistant (PDA), a mobile terminal, a mobile communication terminal in the form of a cellular/mobile phone, or a multimedia device or computer. In alternate embodiments, the system 100 of FIG. 1 may be a personal communicator, a mobile phone, a tablet computer, touch pad device, Internet tablet, a laptop or desktop computer, a television or television set top box a DVD or High Definition player or any other suitable device capable of containing for example a display 114 shown in FIG. 1, and supported electronics such as the processor 918 and memory 902 of FIG. 9A. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 1, the display 114 of the system 100 can comprise any suitable display, such as noted earlier, a touch screen display, proximity screen device or graphical user interface. In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of an LCD with optional back lighting, such as a TFT matrix capable of displaying color images. A touch screen or proximity screen device may be used instead of a conventional LCD display.

The system 100 may also include other suitable features such as, for example, a camera, loudspeaker, connectivity port or tactile feedback features.

Figure 11:
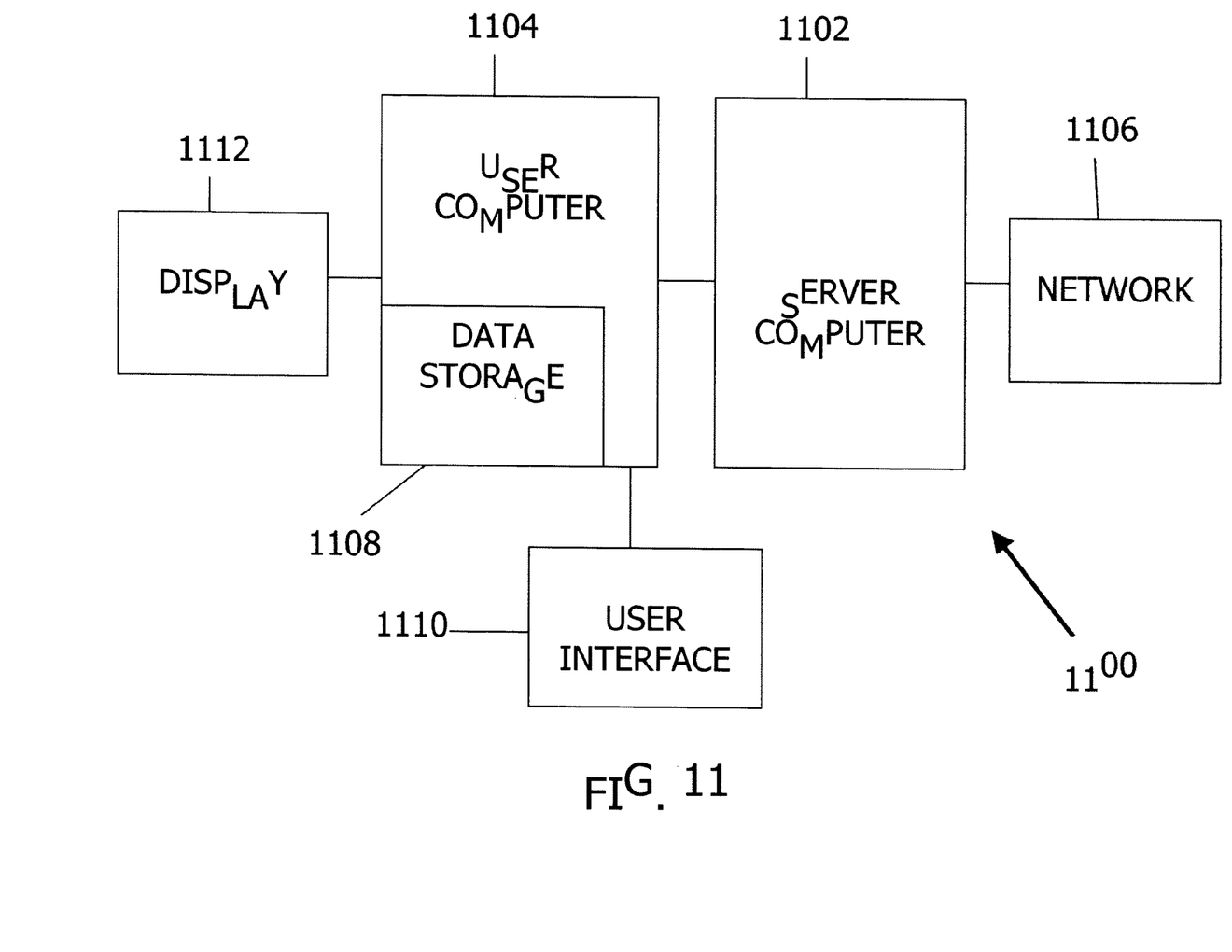
FIG. 11 illustrates a block diagram of an exemplary apparatus incorporating features that may be used to practice aspects of the disclosed embodiments.

The disclosed embodiments may also include software and computer programs incorporating the process steps and instructions described above that are executed in different computers. FIG. 11 is a block diagram of one embodiment of a typical apparatus 1100 incorporating features that may be used to practice aspects of the invention. The apparatus 1100 can include computer readable program code means for carrying out and executing the process steps described herein. As shown, a computer system 1102 may be linked to another computer system 1104, such that the computers 1102 and 1104 are capable of sending information to each other and receiving information from each other. In one embodiment, computer system 1102 could include a server computer adapted to communicate with a network 1106. Computer systems 1102 and 1104 can be linked together in any conventional manner including, for example, a modem, wireless, hard wire connection, or fiber optic link. Generally, information can be made available to both computer systems 1102 and 1104 using a communication protocol typically sent over a communication channel or through a dial-up connection on ISDN line. Computers 1102 and 1104 are generally adapted to utilize program storage devices embodying machine-readable program source code, which is adapted to cause the computers 1102 and 1104 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 1102 and 1104 may also include a microprocessor for executing stored programs. Computer 1102 may include a data storage device 1108 on its program storage device for the storage of information and data. The computer program or software incorporating the processes and method steps incorporating aspects of the invention may be stored in one or more computers 1102 and 1104 on an otherwise conventional program storage device. In one embodiment, computers 1102 and 1104 may include a user interface 1110, and a display interface 1112 from which aspects of the invention can be accessed. The user interface 1110 and the display interface 1112 can be adapted to allow the input of queries and commands to the system, as well as present the results of the commands and queries.

The disclosed embodiments generally provide a simplistic and intuitive image capturing system and method that hides the complexities of image capturing from the user of the system 100. The disclosed embodiments also improve the perceived quality of video captured with system 100 and can detect and point out frame degradation resulting from, for example, hand shaking, motion blur or any other degradation source. The disclosed embodiments can be implemented in, for example, both standard video player or in advanced software tools for video manipulation and editing.

It should also be realized that the disclosed embodiments can be extended beyond video capture. As a non-limiting example, the disclosed embodiments may apply to capturing a portion of a song, broadcast or any other suitable sound file playing on, recorded by, stored in or otherwise acquired by the system 100. In one example, a noise level threshold may be set where the quality indicator indicates which portions of the sound clip are good and bad (i.e. respectively below and above the nose level threshold).

It should be understood that the disclosed embodiments may be used individually or in any combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   presenting a video sequence on a display where the video sequence includes video frames;
   calculating a quality indicator with respect to the video frames; and
   automatically indicating which video frames meet or exceed a predetermined image quality threshold depending on the quality indicator,
   wherein the quality indicator for each respective video frame comprises a mean band pass energy of the respective video frame and a smoothed band pass energy of video frames previous to the respective video frame.

2. The method of claim 1, further comprising capturing one or more video frames that meet or exceed the predetermined image quality threshold.

3. The method of claim 2, wherein the captured video frames are printed or saved as an image.

4. The method of claim 1, wherein the quality indicator includes a quality indicator for each respective video frame and a temporal quality indicator for the video frames.

5. The method of claim 3, wherein the quality indicator further includes a percentage of sharp areas of a respective video frame.

6. An apparatus comprising:
   a processor;
   an input device connected to the processor; and
   a display connected to the processor;
   wherein the processor is configured to:
   present a video sequence on the display where the video sequence includes video frames;
   calculate a quality indicator with respect to the video frames; and
   automatically indicate which video frames meet or exceed a predetermined image quality threshold depending on the quality indicator,
   wherein the quality indicator for each respective video frame comprises a mean band pass energy of the respective video frame and a smoothed band pass energy of video frames previous to the respective video frame.

7. The apparatus of claim 6, wherein the processor is further configured to capture one or more video frames that meet or exceed the predetermined image quality threshold.

8. The apparatus of claim 7, wherein the captured video frames are printed or saved as an image.

9. The apparatus of claim 6, wherein the quality indicator includes a quality indicator for each respective video frame and a temporal quality indicator for the video frames.

10. The apparatus of claim 9, wherein the processor is further configured to calculate a percentage of sharp areas of a respective video frame, wherein the quality indicator further includes the percentage of sharp areas.

11. The apparatus of claim 6, wherein the apparatus is a mobile communication device.

12. A user interface comprising:
    a frame selection control module connected to a display, the frame selection control module being configured to determine a quality indicator for each frame and to determine which frames in a sequence of video frames presented on a display exceed a predetermined image quality threshold value; and
    a frame indication module connected to at least one of the frame selection control module and display, the frame indication module being configured to allow viewing and selection of one or more of the frames that exceed the predetermined image quality value for printing,
    wherein the quality indicator for each respective frame comprises a mean band pass energy of the respective frame and a smoothed band pass energy of frames previous to the respective frame.

13. The user interface of claim 12, further comprising a module for changing the image quality threshold value.

14. The user interface of claim 12, wherein the frame indication module is further configured to automatically indicate to a user the frames that exceed the predetermined image quality value.

15. The user interface of claim 14, where the indicator is an image presented on the display along with a corresponding frame.

16. A method for printing video frames comprising:
    automatically determining which frames in a sequence of video frames presented on a display exceed a predetermined image quality threshold value;
    presenting the frames, along with a corresponding quality indicator, that exceed the predetermined image quality threshold value for selection; and
    selecting one or more of the frames that exceed the predetermined image quality threshold value for printing,
    wherein the quality indicator for each respective frame comprises a mean band pass energy of the respective frame and a smoothed band pass energy of frames previous to the respective frame.

17. The method of claim 16, further comprising changing the image quality threshold value.

18. The method of claim 16, where the quality indicator is an image presented on the display along with a corresponding frame.

19. A computer program product embodied in a memory of a device comprising:
    a computer useable medium having computer readable code means embodied therein for causing a computer to capture one or more video frames from a sequence of video frames, the computer readable code means in the computer program product comprising:
    computer readable program code means for causing a computer to present a sequence of video frames on a display;
    computer readable program code means for causing a computer to calculate a quality indicator with respect to respective frames of the sequence of video frames, wherein the quality indicator for each respective frame comprises a mean band pass energy of the respective frame and a smoothed band pass energy of frames previous to the respective frame;
    computer readable program code means for causing a computer to indicate which video frames meet or exceed a predetermined image quality threshold depending on the quality indicator; and
    computer readable program code means for causing a computer to capture one or more video frames that meet or exceed the predetermined image quality threshold.

20. The computer program product of claim 19, wherein the quality indicator includes a quality indicator for each respective video frame and a temporal quality indicator for the video frames.

21. The computer program product of claim 20, further comprising computer readable program code means for causing a computer to calculate a percentage of sharp areas of a respective video frame, wherein the quality indicator further includes the percentage of sharp areas.

* * * * *